(12) United States Patent
Venneri

(10) Patent No.: US 8,114,456 B2
(45) Date of Patent: Feb. 14, 2012

(54) MILK COMPONENT-BASED SWEET COMPRISING DEFINED EDIBLE FAT AGGLOMERATES, AND METHOD AND DEVICE FOR THE PRODUCTION THEREOF

(75) Inventor: Salvatore Venneri, Kirchhain (DE)

(73) Assignee: Soremartec S.A., Schoppach (BE)

( * ) Notice: Subject to any disclaimer, the term of this patent is extended or adjusted under 35 U.S.C. 154(b) by 1424 days.

(21) Appl. No.: 10/545,229

(22) PCT Filed: Feb. 12, 2004

(86) PCT No.: PCT/EP2004/001307
§ 371 (c)(1),
(2), (4) Date: Feb. 10, 2006

(87) PCT Pub. No.: WO2004/071204
PCT Pub. Date: Aug. 26, 2004

(65) Prior Publication Data
US 2009/0263557 A9  Oct. 22, 2009

(30) Foreign Application Priority Data
Feb. 14, 2003 (DE) .................................. 103 06 259

(51) Int. Cl.
*A23L 1/00* (2006.01)
(52) U.S. Cl. ...................................... 426/564; 426/660
(58) Field of Classification Search .................. 426/564, 426/660
See application file for complete search history.

(56) References Cited

U.S. PATENT DOCUMENTS

| 3,269,843 | A | 8/1966 | McKee et al. |
| 3,749,583 | A | 7/1973 | Cox et al. |
| 4,298,625 | A | 11/1981 | Cillario |
| 4,855,155 | A | 8/1989 | Cavallin |
| 5,084,295 | A | * 1/1992 | Whelan et al. ................ 426/565 |
| 5,230,902 | A | 7/1993 | Gold et al. |
| 5,326,484 | A | 7/1994 | Nakashima et al. |
| 5,494,694 | A | 2/1996 | Herrmann |
| 5,520,946 | A | 5/1996 | Chablaix et al. |
| 6,287,623 | B1 * | 9/2001 | Nakayama et al. ........... 426/584 |
| 2003/0049361 | A1 | 3/2003 | Forte et al. |

FOREIGN PATENT DOCUMENTS

| EP | 0 779 035 A1 | 6/1997 |
| WO | WO 01/45830 A1 | 6/2001 |
| WO | WO 01/56400 A1 * | 8/2001 |

OTHER PUBLICATIONS

*Milchklundliches Speisenlexikon* (Encyclopaedia of Food Involving Milk) by Schulz, M., 1st Ed. (1981) Volkswirt schaftlicher Verlag, Munich, pp. 447-448.
*Milch und Milchprodukte in der Ernährung des Menschen* (Milk and Milk Products in Human Nutrition) by E. Renner, 1st Ed. (1974) Volkswirtschaftlicher Verlag GmbH, Kempten, Verlag Thomas Mann OHG Hildesheim, pp. 333-338 and 419-421.

* cited by examiner

*Primary Examiner* — Jyoti Chawla
(74) *Attorney, Agent, or Firm* — Finnegan, Henderson, Farabow, Garrett & Dunner, LLP

(57) ABSTRACT

The invention relates to a sweet that has a long shelf life and is provided in the form of a soft, creamy, shape-retaining, and foamed mass comprising milk components, edible fats, sugar and/or sugar substitutes, and water. At least one portion of the edible fat is provided in a crystallized form at ambient temperature. The inventive sweet does not contain any lactose crystals that can be perceived by the consumer. The milk protein content amounts to 5.5 to 20% by weight while the fat-free dry milk content ranges between 14 and 55% by weight and the degree of denaturation of the whey protein amounts to $\leq 10\%$. The inventive sweet is characterized by the fact that the crystallized and non-crystallized edible fat agglomerates have a volume-related particle size D50,3 of 3.5 to 18 μm.

9 Claims, 1 Drawing Sheet

Figure 1:
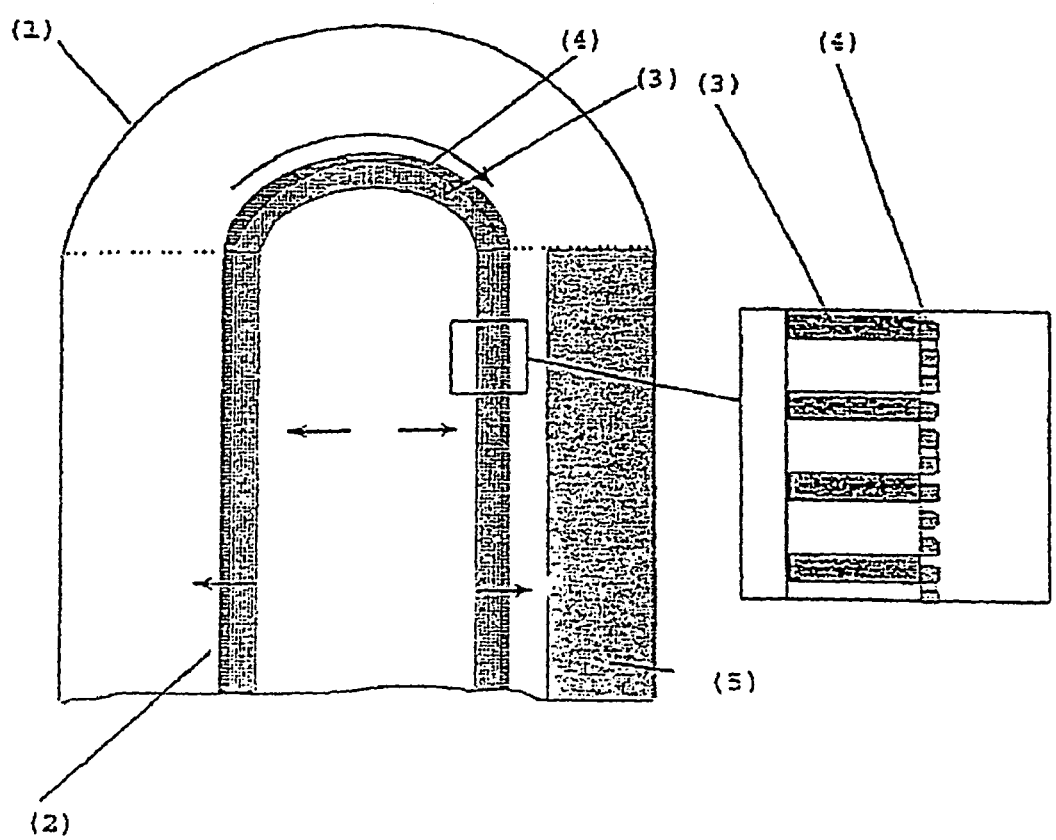

MILK COMPONENT-BASED SWEET COMPRISING DEFINED EDIBLE FAT AGGLOMERATES, AND METHOD AND DEVICE FOR THE PRODUCTION THEREOF

The invention relates to a milk component-based sweet as well as to a method and device for the production thereof.

DE-30 15 825 C2 describes a sweet which has a long shelf-life and is in the form of a soft mass that has been foamed with an inert gas and is based on an oil-in-water emulsion, which comprises milk components, edible fat, sugar, monoglycerides and water and has a pH range of 6.2 to 7.5. The consistency of the sweet ranges from a spreadable cream to a comparatively thick paste that is firm enough to cut. It has a stable form and a long shelf-life and does not contain any lactose crystals that can be perceived by the consumer. Furthermore, at least part of the edible fat is contained in crystallised form. Taken as a basis when producing this sweet is a sweetened, semi-skimmed condensed milk, which forms the main component of an aqueous phase that is processed with an oil phase containing edible fats and monoglycerides into an oil-in-water emulsion. The emulsion is then pasteurised, lactose seed crystals are added thereto, and the emulsion is foamed by blowing in inert gas. At least part of the edible fat is crystallised during stirring and cooling of the emulsion.

When producing condensed milk, temperatures of 100 to 120° C. are usually used for 1 to 3 minutes during pasteurisation of the milk and temperatures of 65 to 70° C. are used during evaporation of the milk, which lead to the partial denaturation of the whey proteins.

Furthermore, DE-43 44 534 C1 describes a foamed milk cream that is produced by heating milk adjusted to a certain fat and protein content and/or milk products so as to denature the serum proteins and for bacteriological reasons, then stirring honey, dry components and flavouring agents into the milk, producing a mixture of fat(s) with emulsifiers and/or stabilisers, then blending this mixture with the milk mixture produced earlier and heating it for bacteriological reasons, the mixture being subsequently cooled to a whipping temperature, the mixture being whipped and the whipped mixture then being allowed to cool and crystallise.

However, the process described above leads to a sweet containing a considerable proportion of denatured whey proteins.

Sweets produced from fresh, pasteurised whole milk (fresh milk) and skimmed milk powder as the milk base also belong to the prior art. Owing to the high temperatures used during production, the skimmed milk powder hereby has a higher content of denatured whey proteins and also a higher vitamin loss.

However, the presence of natural milk protein (lower degree of denaturation of the whey proteins) accompanied by a high milk protein content and a high dry milk mass is desirable for reasons of nutritional physiology.

Yoghurt and quark-based sweets according to DE-37 27 680 C2 also belong to the prior art, which, however, contain a high proportion of denatured whey proteins. Products available on the market, such as Kyr (Parmalat) and Merenda allo Yogurt (Plasmon), have a degree of denaturation that is clearly greater than 20%. The edible fats in these products furthermore form agglomerates having a volume-related particle size D50,3 of 27 µm and 50 µm respectively. The particle size D50,3 specifies the particle diameter below which 50% of the total particle volume lies.

The prior art furthermore comprises ice creams having a milk protein content of 1.5 to 5% by weight, a fat-free dry milk mass of 4 to 12% by weight and an edible fat content of 10 to 14% by weight, each based on the total weight of the ice cream. Several commercial samples of ice cream examined furthermore had a diameter D50,3 of the fat agglomerates of between 19 and 30 µm.

Described in DE-100 05 374 A1 is a sweet with a long shelf-life that is in the form of a soft, creamy, foamed mass with a stable form, comprising milk components, edible, fats, sugar and/or sugar substitutes and water, at least part of the edible fat being contained in crystallised form at room temperature, the sweet not containing any lactose crystals that can be perceived by the consumer, and the milk protein content being 6 to 20% by weight, the fat-free dry milk mass being 16 to 55% by weight and the degree of denaturation of the whey proteins being <10%. These sweets, produced according to the method described in DE-100 05 374 A1, have a volume-related particle size D50,3 of the edible fat agglomerates which is in the range of 1.5 to 2.5 µm.

The object forming the basis for the invention is to provide a sweet having a further improved stability in terms of a longer shelf-life and a longer retention, in terms of time, of the characteristic properties such as softness, creaminess, form stability, fresh taste and milk flavour.

The above object is solved by a sweet with a long shelf-life having the properties described in claim 1, which will be discussed in more detail below.

The sweet according to the invention has a volume-related particle size D50,3 of the edible fat agglomerates of 3.5 to 18 µm, which causes improved stability of the structure, which in turn increases long-term stability and also maintains the advantageous properties for a longer period of time. The improved stabilisation causes, in particular, a lower segregation tendency.

The sweet according to the invention has an extended shelf-life. This means that it can be stored in cold storage (<12° C.), e.g. in the refrigerator or a cold shelf, for at least 9 months, i.e. no objections can be made in terms of microbiology. The long shelf-life of the sweet according to the invention is essentially due to its dry milk mass and sugar or sugar substitute content, the defined agglomerate particle size of the dispersed edible fat as well as to a pasteurising process during production thereof. Milk protein and sugar or sugar substitutes cause water binding and a decrease in water activity. The water activity aw is preferably <0.9.

The sweet according to the invention is furthermore soft and thus also easy to spread. The word "soft" characterises the solidity of the sweet and can be described by the effective viscosity which preferably has values of 100 to 5000 Pas, particularly preferred 500 to 2000 Pas, at a shear rate of 0.5 s−1 and a temperature of 20° C. As a result of the agglomerate particle size according to the invention of the edible fat present in a dispersed manner in the sweet, the softness of the sweet can be maintained over a long period of time.

The creamy consistency of the sweet according to the invention is adjusted in particular by the dry milk mass, the melting range of the fats, the proportion of sugar and sugar substitutes and the water content. A sweet is deemed to be "creamy" if its effective viscosity decreases as the shear rate increases. Accordingly, the property of creaminess of the sweet of the invention is determined using measuring technology via the viscosity trend in dependence on the shear rate. The creamy consistency of the sweet can also be maintained over a long period of time owing to the presence of the edible fat agglomerates in the form of particles having a D50,3 value of 3.5 to 18 µm.

The sweet according to the invention is furthermore dimensionally stable (has a stable form). In terms of rheology, this means that it has a yield point and therefore does not yield under the influence of gravity. The dimensional stability is furthermore improved owing to the particle size of the edible fat agglomerates according to the invention since the danger of segregation of the aqueous phase and the edible fat phase of the sweet decreases.

The sweet according to the invention is furthermore foamed and is characterised preferably by a density of 0.55 to 0.75 g/cm$^3$ and a specific area of interface of 700 to 2500 cm$^2$/cm$^3$.

The milk components in the sweet according to the invention include the milk proteins derived from the milk, the milk sugar (lactose), the milk salts and the vitamins of the milk as well as the milk fat. In addition to whole milk, semi-skimmed milk or skimmed milk, yoghurt or sour milk produced herefrom can also be used to produce the sweet.

The edible fats contained in the sweet according to the invention are composed of milk fat and/or vegetable and/or animal fats added during production, such as, for example, palm oil, pure butter fat or margarine. The total content of edible fat in the sweet according to the invention is preferably 15 to 50% by weight, particularly preferred 20 to 45% by weight. At least part of the fat is in crystallised form at room temperature. The melting enthalpy of the fat is thereby preferably at least 10 joules/g at a temperature range of 20 to 50° C. The particle size D50,3 of the crystallised and non-crystallised edible fat agglomerates is furthermore preferably 4.0 to 16 μm and particularly preferred 4.5 to 14 μm.

The sugar in the sweet according to the invention includes the lactose derived from the milk and sugar added during production, e.g. in the form of honey, saccharose, lactose, glucose, fructose, maltose and galactose. The sugar content of the sweet according to the invention can be entirely or partially replaced by sugar substitutes such as, for example, sugar replacements (e.g. sorbitol, malititol, isomaltol, xylitol), oligosaccharides and oligofructoses. The total content of sugar and sugar substitutes is preferably in the range of 8 to 45% by weight, particularly preferred 10 to 40% by weight.

According to another preferred embodiment of the sweet according to the invention, the water content is 13 to 45% by weight, particularly preferred 20 to 35% by weight.

In the case of production from unfermented milk products, the sweet according to the invention has a pH value that is typically in the range of 6.2 to 7.5. If the sweet is produced using yoghurt or sour milk, the pH value is preferably 4.0 to 5.5, particularly preferred 4.2 to 4.8.

The sweet according to the invention can furthermore contain emulsifiers, preferably mono- and/or diglycerides, normally in an amount of 0 to 1% by weight.

The sweet according to the invention may also contain further ingredients. Dietary fibres, oligosaccharides and polysaccharides, such as, for example, starch or maltodextrin, can be hereby used to adjust the consistency. Cocoa, flavourings, sweeteners and colorants, for example, can be included in order to adjust the flavour and colour. Secondary plant extracts, prebiotics and probiotics, for example, can also be added in order to increase the physiological valence of the sweet according to the invention.

The sweet according to the invention is characterised by a high (fat-free) dry milk mass and a high milk protein content accompanied by a very low degree of denaturation of the whey proteins. Associated with the low degree of denaturation is low damage to the proteins and therefore a high content (percentage) of native milk protein, and thus also low vitamins losses with respect to the starting milk product used during production.

The fat-free dry milk mass is preferably 14 to 37% by weight. The milk protein content is furthermore preferably 5.5 to 14% by weight.

The low degree of denaturation (≦10%) in the sweet according to the invention results in a very intensive milk flavour. It is furthermore possible to produce the sweet according to the invention without emulsifiers. In a further preferred embodiment, the degree of denaturation of the whey proteins is 0%, i.e. no longer detectable.

A high content of natural milk protein is important in terms of nutritional physiology since native proteins can be fully utilised in the human body.

The sweet according to the invention contains the edible fats (crystallised and non-crystallised) at an agglomerate particle size D50,3 of 3.5 to 18 μm, preferably 4.0 to 16 μm, and particularly preferred 4.5 to 14 μm. The particle size defined above results in the structure of the sweet being maintained for longer since the tendency of the aqueous phase and the edible fat phase to segregate decreases. This causes, at the same time, an increase in the microbiological shelf-life, the dimensional stability and also a retention of the softness, creaminess and the intensive milk flavour and taste over a longer period of time.

In the sweet according to the invention, the edible fat agglomerates consist of individual fat droplets that are bonded together at individual sites by means of bridges. These bridges determine, to a decisive extent, the yield point of the foam and thus its stability against the influence of gravity (dimensional stability). The bridges do not, however, create large, compact edible fat particles, but can rather be broken again under the influence of temperature and shearing (typical stress in the mouth). The edible fat is then once again in the form of small individual droplets, which creates a creamy-tender creamy consumption impression. However, if the edible fat agglomerates are too large, they cannot be broken down into small individual particles at the same speed, and the consumption impression is not tender creamy/creamy but rather fatty since too much of the surface of the mouth is covered with fat at the same time. For this reason, it has been found according to the invention that the agglomerate particle size of the edible fats may, on the one hand, not be too small, and on the other, may not be too large.

The sweet according to the invention can be produced using a process having the following steps:
a) mixing pasteurised, fresh whole milk, sour whole milk or whole milk yoghurt and/or pasteurised, fresh semi-skimmed milk, sour semi-skimmed milk or semi-skimmed milk yoghurt and/or pasteurised, fresh skimmed milk, sour skimmed milk or skimmed milk yoghurt with sugar and/or sugar substitutes and, optionally, other additives;
b) adjusting the mixture obtained in step a) by means of gentle evaporation at a temperature of ≦60° C. and a pressure of <1 bar or by freeze drying to the desired dry substance content;
c) dispersing a fat phase comprising edible fats and, optionally, emulsifiers in the concentrated aqueous mixture obtained in step b) using a rotating microporous membrane hollow cylinder, the outer surface of which faces the aqueous phase and the inner surface of which faces the fat phase, the surface facing the aqueous phase having an outer membrane layer with pores of ≦1 μm;
d) pasteurising the sweet obtained in step c) at temperatures of max. 80° C.;
e) cooling the sweet, optionally mixing in lactose microcrystals, foaming the sweet by blowing in gas and crystallising out at least part of the edible fat of the sweet.

The production process according to the invention is described in more detail below with reference to individual production steps.

Pasteurised, fresh whole milk, sour whole milk or whole milk yoghurt and/or pasteurised, fresh semi-skimmed milk, sour semi-skimmed milk or semi-skimmed milk yoghurt and/or pasteurised, fresh skimmed milk, sour skimmed milk or skimmed milk yoghurt is used in step a). According to the "Milchverordnung" (German Regulation Concerning Milk), the fresh milk, which is used as such or as sour milk or milk yoghurt, has been subjected to a short-time heat treatment in a continuous flow at 72 to 75° C. with a heat-holding time of 15 to 30 seconds and shows, following the short-time heat treatment, negative evidence of phosphatase and positive evidence of peroxidase.

The thus pasteurised fresh whole milk (sour whole milk, whole milk yoghurt) or pasteurised, fresh semi-skimmed milk (sour milk, milk yoghurt) or pasteurised, fresh skimmed milk (sour skimmed milk, skimmed milk yoghurt) is mixed with sugar and/or sugar substitutes. Mixing hereby occurs, as a rule, at a temperature of ≦60° C. and can occur in a continuously operated mixing device or in batch containers.

In order to adjust the consistency, the taste and colour and the physiological valence, other ingredients can also be mixed into the milk, sour milk or milk yoghurt, such as, for example, polysaccharides, cocoa, flavours such as vanillin, sweeteners and colorants, secondary plant extracts, probiotics and prebiotics.

Concentration to the desired dry substance content according to production step b) is carried out, for example, in an evaporator at temperatures of ≦60° C. and at a low pressure of <1 bar or by freeze-drying.

During production according to step c), the aqueous phase (concentrated mixture) obtained in step b) is preferably present in an amount of 50 to 85% by weight and is mixed with the fat phase preferably in an amount of 15 to 50% by weight.

Vegetable and/or animal fats are normally used as the fat phase, such as, for example, palm oil, pure butter fat or margarine, all of which are edible fats. The use of emulsifiers, preferably mono- or diglycerides, is possible.

In the rotating microporous membrane dispersing process, the edible fat phase to be dispersed is introduced, from the inside to the outside, through the rotating microporous membrane hollow cylinder into the (continuous) aqueous phase flowing past using adjustable centrifugal forces.

The dispersing in which is carried out in step c) normally takes place at a temperature of ≦60° C. such that the liquid phases continue to exist during dispersing in.

A pressure of 0 to 5 bar, preferably 0.8 to 1.5 bar, is furthermore applied in production step c). The pressure has an influence on the volume flow of the fat through the rotating membrane body. The greater the pressure, the larger the size of the fat droplets under otherwise identical conditions.

The circumferential speed of the rotating microporous membrane hollow cylinder is adjustable via the rotational speed and the outer diameter of the membrane body and is preferably 0.35 to 35 m/s, particularly preferred 1.4 to 11 m/s.

The dispersing in which is carried out in production step c) causes minimal shearing such that denaturation is largely excluded and very low degrees of denaturation of <10%, particularly preferred of 0% (denaturation below the detection limit), are thus achieved overall.

A microporous glass sinter tube is preferably used as the membrane hollow cylinder. Such a glass sinter tube preferably consists of a glass sinter support body with pores of 5 to 25 μm and an outer sintered glass layer having a pore size of <1 μm, particularly preferred 0.4 to 0.8 μm, and especially preferred 0.7 to 0.8 μm. In a further preferred embodiment, the sintered glass layer consists of several sintered layers, the layer with the smallest average pore size forming the interface to the continuous aqueous phase. The sintered glass layer is furthermore preferably 1 to 2 mm thick. Finally, the sintered glass layer is preferably made of borosilicate glass 3.3.

The droplet size of the edible fat is determined by the wall shear stress which is directly proportional to the rotational speed (revolutions per minute) of the membrane body and to the viscosity of the continuous aqueous phase. A high wall shear stress enables early droplet separation and thus the formation of smaller fat droplet particles.

An increasing viscosity of the continuous aqueous phase increases the wall shear stress which causes the droplets to separate sooner. Furthermore, as the viscosity increases, droplet growth is also exposed to increasing resistance. Both factors lead to a reduction in the droplet size.

Small droplets are obtained with a low pressure, a high viscosity of the continuous aqueous phase and a high circumferential speed of the membrane body.

The droplet size of the edible fats is furthermore determined by the pore size of the used outer membrane layer which is in contact with the aqueous phase. The droplet size is generally 5 to 10 times greater than the outer micropores of the membrane layer.

The edible fat droplets agglomerate owing to mechanical stress in the following production steps and in particular during cooling and foaming according to step e) of the production process. The droplet size of the edible fats hereby influences the size of the edible fat agglomerates formed. The smaller the droplet size, the smaller the agglomerates and the D50,3 value, and vice versa, under otherwise identical production conditions.

In the above-described production process for the sweet according to the invention, it is also possible to disperse the fat phase according to step c) directly into the mixture obtained from step a) and then to adjust the desired dry substance content by means of evaporation (step b)).

The subsequent pasteurisation step d) for the sweet takes place at a temperature of not more than 80° C. The pasteurisation temperature is normally 70 to 80° C. and the pasteurisation process normally lasts 1 to 4 minutes. In order to avoid a loss in the total amount of water in the end product, care must be taken during pasteurisation that water loss does not occur owing to evaporation or removal of water. It is therefore recommended to use a sufficient hydrostatic pressure.

Following the pasteurisation phase, the sweet is cooled in step e), for example using a cooling system connected to the outlet of the pasteurising apparatus.

During cooling, the sweet can be optionally injected with a small amount of small lactose seed crystals, on which the dissolved lactose can subsequently crystallise without creating a sensory grittiness. It is possible to produce a suspension of seed crystals and a liquid and to continuously add this to the sweet.

The sweet is then cooled further, e.g. by means of one or more cooling systems. The sweet is foamed during this phase, normally by injecting or blowing into the sweet a dosed supply of gas, preferably inert gas (e.g. nitrogen), by means of an injector or a rotating microporous membrane. Furthermore, at least part of the edible fat is crystallised out.

In non-frozen sweets, the temperature, for example, of the first cooling step is 60 to 30° C., whereupon injection with lactose seed crystals occurs and the sweet is then cooled in a subsequent cooling step to, for example, 20 to 10° C. before foaming and crystallising out of the edible fat occurs.

When producing frozen sweets such as, for example, ice cream, the pasteurised mixture resulting from step d) is cooled to below the freezing point, e.g. by means of a tubular heat exchanger, and is subjected to cold storage, for example for 24 hours in a ripening tank. The cooled mixture is then cooled further in a freezer and is supplied with gas. Hardening is thereupon carried out to stabilise the structure in a refrigerator at preferably −30 to −45° C. until a product core temperature of −25° C. has been reached.

The foamed sweet resulting from the process according to the invention can be aseptically filled as such into containers that can be sealed in an airtight manner and sold.

The sweet according to the invention is also suitable for use directly as a component of a consumable product, for example as the filling when making a baked product, e.g. a milk cream slice, in which the sweet is applied to a layer of the baked product or in a sandwich-like manner between two or more layers of the baked product, or is used as a filling in a rolled baked product.

The sweet according to the invention can also be used for application on or in a pastry product. The sweet according to the invention can furthermore be used as a filling, as part of a filling or as a decoration of filled chocolate products or confectionary. The sweet can hereby also be mixed with fruit (fruit filling).

It is finally also possible to use the sweet according to the invention as a dessert, as a component of a dessert or as a spread for bread.

Finally, the invention relates to the use of a dispersing device for producing the sweet according to the invention.

This dispersing device comprises a temperature-controllable, cylindrical vessel and a rotatable microporous membrane hollow cylinder (tube) that is disposed in the centre of the vessel and has an outer membrane layer with pores of <1 μm.

The microporous membrane hollow cylinder preferably consists of an inner glass sinter support tube with pores of 5 to 25 μm and an outer sintered glass layer having a thickness of 1 to 2 mm and a pore size of <1 μm. Particularly preferred is an average pore size of the sintered glass layer of 0.4 to 0.8 μm, and especially preferred is 0.7 to 0.8 μm. According to a further preferred embodiment, the outer sintered glass layer consists of several sintered glass layers having different pore sizes, the layer with the lowest average pore size forming the outermost layer. It is also particularly preferred for the sintered glass layer(s) to be made of borosilicate glass 3.3.

A dispersing device that is preferably used is described in more detail below with regard to FIG. 1.

FIG. 1: Dispersing device for the production of the sweet according to the invention.

The dispersing device consists of a temperature-controllable, cylindrical vessel (1). Delivery of the forming dispersion preferably occurs by means of an eccentric single-rotor screw pump. A hollow shaft is disposed in the centre of the vessel, which actuates a glass sinter tube (2) and via which the inflow of liquid edible fat occurs. The glass sinter tube (2) consists of a microporous glass sinter support body (3) made of sintered glass having an average pore size of 5 to 25 μm. A sintered glass layer (4) having an average pore size of <1 μm is disposed on this support body (3). The glass sinter tube (2) is fixed to the hollow shaft by means of two planar seals such that transport of the substance can only occur via the capillary system of the glass sinter body. The glass sinter tube (2) is caused to rotate owing to the force-locking connection with the shaft. The rotational speed of the shaft and thus the circumferential speed of the glass sinter tube (2) can be adjusted. Vertical flow disturbers (5) in the form of plates are preferably attached in the space between the inner wall of the temperature-controllable, cylindrical vessel (1) and the outside surface of the glass sinter tube (2). During operation, the space between the inner wall of the cylindrical vessel (1) and the outside surface of the glass sinter tube (2) is completely filled with the aqueous phase and the inner volume of the glass sinter tube (2) is completely filled with liquid edible fat.

The invention will be described in more detail below by means of two examples.

EXAMPLE 1A)

Milk Cream

In order to obtain 100 kg of milk cream (sweet), a total of 142.6 kg of water was extracted from a mixture of 190.1 kg of pasteurised, fresh whole milk (water content 87.5%, dry milk mass 12.5% and fat-free dry milk mass 9% according to the nutritional value tables for milk and milk products according to E. Renner, 1992), 18.2 kg of saccharose, 7.5 kg of honey and 0.05 kg of vanillin by means of evaporation at 48 to 55° C. such that the dry substance content of the concentrated mixture is 65.74%.

5.186 kg of palm oil were mixed into the obtained aqueous concentrated mixture (14.65 kg) at 55° C. using a dispersing cell. The dispersing apparatus corresponds to the device as shown in FIG. 1 and consists of a temperature-controllable, cylindrical vessel (1) having a height of 365 mm and a diameter of 210 mm, which is operated continuously via an inlet and an outlet and which is connected to an equalising vessel, the forming mixture being pumped in circulation by an eccentric single-rotor screw pump. The sinter tube (2) consists of a support body (3) made of sintered borosilicate glass 3.3 having a thickness of 15 mm. A sintered glass layer (4) of borosilicate glass 3.3 having an average pore size of 12.5 μm and a thickness of 1.5 mm is disposed on this support body. The circumferential speed of the glass sinter tube (2) was adjusted to 5.3 m/s. A static pressure of 1.0 bar is applied to the liquid edible fat disposed inside the glass sinter tube (2). The dispersion temperature is adjusted to 55° C.

Following production of the raw cream by means of dispersion, said cream then flows through a pasteurising apparatus (scrape heat exchanger) having a temperature of 70° C. for 3.5 minutes.

The pasteurised cream subsequently arrives in a first cooling system (scrape chiller) in which the cream remains for 3.5 minutes at 44° C. A dispersion of lactose microcrystals (0.001 kg) and palm oil (0.12 kg) is then added continuously by means of a dosing pump.

The cream flows into a second cooling system (scrape chiller) in which it remains for 3.5 minutes at 18° C. During this dwelling time, the cream is foamed with nitrogen by means of an injector such that the density of the foamed cream in this production step is in the range of 0.5 to 0.6 g/cm³. The hourly output of the system is approximately 26 kg of cream. After the second cooling system, the cold cream is filled into a vessel that can be sealed in an airtight manner or is placed between two layers of a baked product.

The analytically determined composition of the cream obtained above as well as its physical and organoleptic properties are given in table 1 below.

EXAMPLE 1B)

Yoghurt Cream

A ripening culture (mixture of *streptococcus thermophilus* and *lactobacillus bulgaricus*) is mixed into pasteurised, fresh whole milk at 42° C. and is incubated until a pH of 4.5 is reached (duration 2.5 to 3 hours), whereby a fresh yoghurt is obtained which is used and is further processed, similar to example 1a), in the same amount instead of the fresh whole milk.

The analytically determined composition and the properties of the yoghurt cream obtained in this manner are given in table 1 below.

EXAMPLE 1C)

Sour Milk Cream

A mesophilic culture (mixture of *streptococcus cremoris* and *streptococcus lactis*) is mixed into pasteurised, fresh whole milk at 25° C. and is incubated until a pH of 4.5 to 4.6 is reached (12 to 15 hours) in order to produce a fresh sour milk which is used and is further processed, similar to example 1a), in the same amount instead of the fresh whole milk.

The analytically determined composition and the properties of this sour milk cream are specified in table 1 below.

TABLE 1

| Ingredients | Patent example 1a) Milk cream | Patent example 1b) Yoghurt cream | Patent example 1c) Sour milk cream |
|---|---|---|---|
| Milk protein content (%) | 6.54 | 5.75 | 5.79 |
| Sugar content (%) | 30.58 | 27.56 | 28.72 |
| Edible fat content (%) | 32.24 | 33.86 | 33.17 |
| Milk fat (%) | 5.6 | 5.1 | 5.5 |
| Mineral salts (%) | 1.23 | 1.17 | 1.22 |
| Mineral salt calcium (%) | 0.209 | 0.189 | 0.188 |
| Lactic acid (%) | 0.02 | 1.19 | 1.12 |
| Water content (%) | 27.68 | 30.91 | 30.41 |
| pH value | 6.8 | 4.45 + 0.01 | 4.41 + 0.01 |
| aw value (20° C.) | 0.90 | 0.90 | 0.90 |
| Total dry milk mass (%) | 23.17 | 19.99* | 20.80** |
| Fat-free dry milk mass (%) | 17.57 | 14.89* | 15.30** |
| Degree of denaturation of the whey proteins (%) | not detectable | not detectable | not detectable |
| Vitamin A (mg/100 g) | 0.051 | 0.047 | 0.051 |
| Vitamin B1 (mg/100 g) | 0.13 | 0.11 | 0.11 |
| Vitamin B2 (mg/100 g) | 0.37 | 0.32 | 0.31 |
| Vitamin B6 (mg/100 g) | 0.072 | 0.081 | 0.089 |
| Vitamin B12 (µg/100 g) | 0.50 | 0.20 | 0.20 |
| Vitamin D3 (µg/100 g) | 0.59 | 0.48 | 0.48 |
| Vitamin E (mg/100 g) | 0.31 | 0.31 | 0.34 |
| Vitamin K1 (µg/100 g) | <1 | <1 | 1.1 |
| Biotin (µg/100) | 2.8 | 1.5 | 2.7 |
| Folic acid (µg/100 g) | <8 | <8 | <8 |
| Niacin mg/100 g) | 0.13 | 0.19 | 0.21 |
| Pantothenic acid/Vitamin B3 (mg/100 g) | 0.60 | 0.52 | 0.55 |
| α-lactalbumin (%) | 1.56 | 1.50 | 0.112 |
| β-lactoglobulin (%) | 5.72 | 5.43 | 4.342 |
| Particle size D50,3 of the fat particle agglomerates (µm) | 6 | 11 | 11 |
| Particle size D50,3 of the lactose crystals (µm) | 15 | 13 | 14 |
| Density (g/cm$^3$) | 0.53 + 0.02 | 0.66 + 0.02 | 0.74 + 0.02 |
| Specific area of interface (cm$^2$/cm$^3$) | 1672 | 874 | 727 |
| Effective viscosity (20° C.), shear rate of 0.5 s − 1 | 835 | 523 | 422 |
| Effective viscosity (20° C.), shear rate of 50 s − 1 | 2.1 | 1.99 | 4.88 |
| Shelf-life | >9 months | >9 months | >9 months |
| Organoleptic properties | very milky, soft, creamy, exceptionally tender creamy, fat practically does not appear | intensive pure yoghurt flavour, soft, creamy, exceptionally tender creamy, fat practically does not appear | intensive pure sour milk flavour, soft, creamy, exceptionally tender creamy, fat practically does not appear |

*total yoghurt or fat-free yoghurt dry mass including lactic acid
**total sour milk or fat-free sour milk dry mass including lactic acid The following analytic methods were used to determine the composition of the cream.

| | |
|---|---|
| Dry mass/water | IDF 21B: 1987 (sea sand 102° C.) |
| Edible fat | IDF 126A: 1988 (method according to Weibull) |
| Milk fat | DGF C-V 9a (determination using the semi-micro butyric acid number) |
| Protein (N × 6.38) | IDF 20B: 1993 (method according to Kjeldahl) |
| Lactose/galactose | Sec. 35 LMBG[1] L 01.00-17; enzymatically, Boehringer test kit |
| Saccharose/ Glucose/Fructose | enzymatically, Boehringer test kit |
| Ash | VDLUFA VI C 10.2 (550° C.) |
| Calcium | gravimetrically |
| Degree of denaturation | SDS-PAGE-Electrophoresis: The degree of denaturation of β-lactoglobulin was electrophoretically determined as a measure of the denaturation of whey proteins present in the cream. The degree of denaturation, given in %, indicates the proportion of native B-lactoglobulin to the total β-lactoglobulin (after total reduction) and is calculated from the ratio of the peak areas to one another. |

The sample to be examined is pre-treated with sodium dodecyl sulphate (SDS) in order to unfold the milk proteins. With the subsequent total reduction of the unfolded protein molecules using dithiotretitol (DTT), the monomeric, reduced form of the total β-lactoglobulin is obtained. In a parallel approach, the sample is treated solely with SDS in order to be able to determine the native, non-reduced proportion of the lactoglobulin. The lower the native proportion of β-lactoglobulin, the higher the degree of denaturation.

-continued

| | Separation of the individual milk proteins occurs by means of pore gradient gel electrophoresis according to molecule size. The fixed and coloured proteins are quantitatively evaluated based on densitometric measurement. The degree of denaturation, based on β-lactoglobulin, specified in %, is calculated using the following formula: |
|---|---|
| | $D = 1 - \dfrac{PF\beta\text{-lactoglobulin native} \times 100}{PF\beta\text{-lactoglobulin reduced}}$ |
| | D in % PF: peak area of the β-lactoglobulin band in the native and reduced state. |
| Vitamin B1 | fluorimetrically |
| Vitamin B2 | HPLC |
| Vitamin B6 | HPLC |
| Vitamin B12 | turbidimetrically according to USP XXIII, 1995, M.171 |
| Vitamin K1 | HPLC |
| Vitamin D3 | Sec. 35 LMBG L 49.00-1; HPLC |
| Vitamin A | Sec. 35 LMBG L 49.00-3; HPLC |
| Vitamin E | Sec. 35 LMBG L 49.00-3; HPLC |
| Niacin | turbidimetrically according to USP XXIII, 1995, M.441 |
| Folic acid | microbiologically |
| Pantothenic acid/ Vitamin B3 | turbidimetrically according to USP XXIII, 1995, M.91 |
| Biotin | turbidimetrically according to USP XXI, 3.SUPPL. 1986, M.88 |
| α-lactalbumin | IDF 178: 1996 (HPLC) |
| β-lactoglobulin | IDF 178: 1996 (HPLC) |

[1]German Foods and Commodities Act

The effective viscosities were determined using a shear rate-controlled rotational rheometer as the measuring device. The measuring system consisted of a plate/plate arrangement (made of steel) having a diameter of the upper plate of 20 mm and a plate gap of 1 mm. The relaxation time before the start of measuring was 120 seconds and the measurements were carried out twice in a measuring range of 0.1 to 100 s−1 in 10 minutes.

The particle size D50,3 of the sugar crystals and the fat particle agglomerates was analysed by means of laser diffraction spectroscopy. The measurements were carried out according to ISO 13320-1. The diffraction pattern obtained was converted into a particle size distribution using the Mie model. In this particular case, the laser diffraction spectrometer Malvern Mastersizer X was used to characterise the particle size.

The parameter D50,3 is defined as follows: 50% of the particle volume is taken up by particles that are smaller than the specified particle diameter.

The crystallinity of the fat was determined using a disc device in a temperature range of 0 to 60° C. and with a heating rate of 2 K/min. Both crystalline and liquid parts of fat could hereby be determined.

The foamed structure of the cream was determined using a scanning electron microscope (SEM), whereby the examined sample was frozen in super-cooled liquid nitrogen, was subsequently broken up and coated with gold or platinum in a cryo-preparation device and then inserted into the electron microscope. The electron micrographs show the fine porosity of the foam which is quantified by the specific area of interface. Using the SEM images, the specific area of interface was determined by means of image analysis/stereology. SEM images of the foam structure magnified 350 times were hereby used as image samples. The outlines of the gas bubbles were marked (complete detection of the bubbles per image; at least 800 bubbles per measurement), the image was scanned and a binary image (bubbles and background) was subsequently created. When evaluating the image, the number of phase transitions between background and bubbles along a set of parallel lines was determined. The specific area of interface was calculated from the number of phase transitions per total line length.

The long shelf-life of the cream results from microbiological data determined following cold storage for 9 months after production. The seed numbers (Sec. 35 LMBG L 01.00-5), yeasts (Sec. 35 LMBG L 01.00-37), moulds (Sec. 35 LMBG L 01.00-37) and enterobacteria (VDLUFA VI M 7.4.2) determined using the plate casting method were so low that no objections can be made from a microbiological point of view.

The effective viscosity values at a shear rate of 0.5 s−1 and at 20° C. show that the creams of Examples 1a) to 1c) are soft. The effective viscosities which decrease as the shear rate increases furthermore also indicate the creamy nature of the produced cream. Since the creams do not yield under the influence of gravity, they are also dimensionally stable.

Since 95% of the sugar crystals are smaller than 12 μm, a grittiness which is perceivable by the senses does not occur.

EXAMPLE 2)

Milk Ice Cream

To produce fresh milk ice cream, 190.1 kg of pasteurised, fresh whole milk (water content 87.5%, dry milk mass 12.5%, fat-free dry milk mass 9%), 18.2 kg of saccharose, 7.5 kg of honey and 0.05 kg of vanillin were mixed together. 109.2 kg of water was gently removed from this mixture at 48 to 55° C. such that the dry substance content of the mixture was 45.5%.

25.9 kg of palm oil were added to the concentrated aqueous phase (106.6 kg) using a dispersion cell.

The raw cream obtained was then pasteurised in a scrape heat exchanger at a temperature of 70° C. for 3.5 minutes.

The pasteurised cream was subsequently cooled to 7° C. using a tubular heat exchanger and arrived in a ripening tank where cold storage at 7° C. took place for 24 hours.

The ripened cream is then continuously conveyed into a freezer, is processed with a throughput of 30 kg/h at a system pressure of 2.05 bar and a rotational speed of the knife shaft of 400 minutes−1 and is foamed with nitrogen up to an overrun of 80%. During filling, the ice cream produced in this manner has a draw temperature of −9.2° C. In order to stabilise the structure of the ice cream, a hardening step is carried out which takes place in a cooling channel at −30 to −45° C. until a maximum product core temperature of −25° C. is reached.

The analytically determined composition of the ice cream obtained above as well as its physical and organoleptic properties are given in table 2 below.

TABLE 2

| Ingredients | Patent example 2 of the ice cream |
|---|---|
| Milk protein content (%) | 6.1 |
| Sugar content (%) | 24.48 |
| Edible fat content (%) | 25.91 |
| Milk fat (%) | 4.7 |
| Mineral salts (%) | 1.04 |
| Mineral salt calcium (%) | 0.171 |
| Lactic acid (%) | 0.03 |
| Water content (%) | 42.28 |
| pH value | * |
| aw value (20° C.) | * |
| Total dry milk mass (%) | 18.95 |

TABLE 2-continued

| Ingredients | Patent example 2 of the ice cream |
|---|---|
| Fat-free dry milk mass (%) | 14.25 |
| Degree of denaturation of the whey proteins (%) | not detectable |
| Vitamin A (mg/100 g) | 0.026 |
| Vitamin B1 (mg/100 g) | 0.031 |
| Vitamin B2 (mg/100 g) | 0.29 |
| Vitamin B6 (mg/100 g) | 0.124 |
| Vitamin B12 (µg/100 g) | <0.1 |
| Vitamin D3 (µg/100 g) | not detectable |
| Vitamin E (mg/100 g) | 0.23 |
| Vitamin K1 (µg/100 g) | <1 |
| Biotin (µg/100) | 4.30 |
| Folic acid (µg/100 g) | <8 |
| Niacin mg/100 g) | 0.15 |
| Pantothenic acid/Vitamin B3 (mg/100 g) | 0.46 |
| α-lactalbumin (%) | 1.200 |
| β-lactoglobulin (%) | 4.730 |
| Ice crystal diameter (D50,0 µm) | 30 |
| Density (g/cm$^3$) | 0.5314 + 0.021 |
| Fat agglomerate diameter (D50,3 µm) | 14 |
| Specific area of interface (cm$^2$/cm$^3$) | * |
| Effective viscosity (20° C.), shear rate of 0.5 s − 1 | * |
| Effective viscosity (20° C.), shear rate of 50 s − 1 | * |
| Organoleptic properties | Very milky, creamy, exceptionally tender creamy, fat practically does not appear |

* these parameters are irrelevant for the characterisation of ice cream

The invention claimed is:

1. A sweet with a long shelf-life in the form of a soft, creamy, form-stable and foamed mass, comprising
    milk components, said sweet having a milk protein content of 5.5 to 20% by weight, based on the total weight of the sweet, a fat-free dry milk mass of 14 to 55% by weight, based on the total weight of the sweet, and a degree of denaturation of the whey proteins 10%,
    edible fats, at least part of said edible fat being contained in crystallized form at room temperature,
    sugar and/or sugar substitutes, said sweet not containing any lactose crystals that can be perceived by the consumer, and
    water,
    wherein edible fat agglomerates in crystallized or non-crystallized form have a volume-related particle size D50,3 of 3.5 to 18 µm such that 50% of the particle volume is taken up by agglomerates that are smaller than 3.5 to 18 µm which cause improved stability of structure and lowers segregation tendency of said foamed mass.

2. A sweet according to claim 1, wherein the edible fat content is 15 to 50% by weight, based on the total weight of the sweet.

3. A sweet according to claim 1 or 2, wherein the sugar and/or sugar substitute content is 8 to 45% by weight, based on the total weight of the sweet.

4. A sweet according to claim 1, wherein the water content is 13 to 45% by weight, based on the total weight of the sweet.

5. A sweet according to claim 1, wherein the milk protein content is 5.5 to 14% by weight, based on the total weight of the sweet.

6. A sweet according to claim 1, wherein the fat-free dry milk mass is 14 to 37% by weight, based on the total weight of the sweet.

7. A sweet according to claim 1, wherein the degree of denaturation is 0%.

8. A sweet according to claim 1, wherein the volume-related particle size D50,3 of the edible fat agglomerates is 4.0 to 16 µm such that 50 % of the particle volume is taken up by agglomerates that are smaller than 4.0 to 16 µm.

9. A sweet according to claim 8, wherein the volume-related particle size D50,3 of the edible fat agglomerates is 4.5 to 14 µm such that 50 % of the particle volume is taken up by agglomerates that are smaller than 4.5 to 14 µm.

* * * * *